(12) United States Patent
Yano et al.

(10) Patent No.: US 10,350,575 B2
(45) Date of Patent: Jul. 16, 2019

(54) REACTOR

(71) Applicant: IHI CORPORATION, Tokyo (JP)

(72) Inventors: Akihisa Yano, Tokyo (JP); Tatsuya Oka, Tokyo (JP); Takahito Akita, Tokyo (JP); Taiga Yamamoto, Tokyo (JP); Hideshi Shibuya, Tokyo (JP); Yushi Kameoka, Tokyo (JP); Yusuke Takeuchi, Tokyo (JP); Koki Yasui, Tokyo (JP); Takuya Yoshinoya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/038,381

(22) Filed: Jul. 18, 2018

(65) Prior Publication Data

US 2018/0318786 A1 Nov. 8, 2018

Related U.S. Application Data

(63) Continuation of application No. PCT/JP2017/001173, filed on Jan. 16, 2017.

(30) Foreign Application Priority Data

Feb. 12, 2016 (JP) .................................. 2016-024453

(51) Int. Cl.
*B01J 19/24* (2006.01)
*F28F 3/06* (2006.01)
(Continued)

(52) U.S. Cl.
CPC ......... *B01J 19/249* (2013.01); *B01J 19/2425* (2013.01); *F28D 9/0037* (2013.01);
(Continued)

(58) Field of Classification Search
CPC .. B01J 19/249; B01J 19/2485; B01J 19/0013; B01J 2219/2411; B01J 2219/2412–2414;
(Continued)

(56) References Cited

U.S. PATENT DOCUMENTS

| 8,173,083 B2 * | 5/2012 | Bowe ..................... B01J 19/249 |
| | | 422/187 |
| 2003/0105172 A1 | 6/2003 | Bowe et al. |

(Continued)

FOREIGN PATENT DOCUMENTS

| CN | 1416361 A | 5/2003 |
| CN | 101367695 A | 2/2009 |

(Continued)

OTHER PUBLICATIONS

Taiwan Patent Office, "Office Action", issued in Taiwanese Patent Application No. 106101409 dated Oct. 17, 2017, 8 pages.

*Primary Examiner* — Lessanework Seifu

(57) ABSTRACT

A reactor has a heat exchanging body including therein a heat medium flow channel in which heat medium flows, and a reaction flow channel in which a reaction fluid flows, to exchange heat between the heat medium and the reaction fluid. A heat transfer promoter is provided in the heat medium flow channel and comes in close contact with the heat exchanging body to promote heat transfer between the heat medium and the heat exchanging body. The heat transfer promoter is an assembly of partial heat transfer promoters of a plurality of types. Replacing the partial heat transfer promoter with another type one, temperature distribution in the heat exchanging body is adjusted.

11 Claims, 8 Drawing Sheets

(51) Int. Cl.
*F28F 3/08* (2006.01)
*F28D 9/00* (2006.01)
*F28F 3/02* (2006.01)
*B01J 19/00* (2006.01)
*F28D 21/00* (2006.01)

(52) U.S. Cl.
CPC ............ *F28D 9/0043* (2013.01); *F28F 3/022* (2013.01); *F28F 3/025* (2013.01); *F28F 3/06* (2013.01); *F28F 3/08* (2013.01); *F28F 3/086* (2013.01); *B01J 19/0013* (2013.01); *B01J 2219/00162* (2013.01); *B01J 2219/2408* (2013.01); *B01J 2219/2453* (2013.01); *B01J 2219/2462* (2013.01); *B01J 2219/2474* (2013.01); *B01J 2219/2479* (2013.01); *B01J 2219/2482* (2013.01); *B01J 2219/2485* (2013.01); *B01J 2219/2493* (2013.01); *F28D 2021/0022* (2013.01)

(58) Field of Classification Search
CPC ....... B01J 2219/2406–2408; B01J 2219/2462; B01J 2219/2464–2466; B01J 2219/2469
See application file for complete search history.

(56) References Cited

U.S. PATENT DOCUMENTS

| | | |
|---|---|---|
| 2004/0034266 A1 | 2/2004 | Brophy et al. |
| 2008/0131341 A1 | 6/2008 | Bowe et al. |
| 2008/0227874 A1 | 9/2008 | Bowe et al. |
| 2009/0004076 A1 | 1/2009 | Brophy et al. |
| 2009/0253814 A1* | 10/2009 | Schodel ................ B01J 19/249 518/700 |
| 2009/0293359 A1 | 12/2009 | Simmons et al. |
| 2010/0174124 A1 | 7/2010 | Tonkovich et al. |
| 2011/0152597 A1 | 6/2011 | Brophy et al. |
| 2012/0177550 A1 | 7/2012 | Tsujii |
| 2014/0291204 A1 | 10/2014 | Tonkovich et al. |
| 2015/0336077 A1 | 11/2015 | Kamata et al. |
| 2016/0194563 A1 | 7/2016 | Tonkovich et al. |

FOREIGN PATENT DOCUMENTS

| | | |
|---|---|---|
| CN | 102245289 A | 11/2011 |
| CN | 102481568 A | 5/2012 |
| EP | 1 559 475 A1 | 8/2005 |
| EP | 1 764 150 A1 | 3/2007 |
| EP | 1 905 508 A2 | 4/2008 |
| EP | 1 905 508 A3 | 9/2012 |
| JP | H02-083031 U | 6/1990 |
| JP | 2002-143675 A | 5/2002 |
| JP | 2003-519563 A | 6/2003 |
| JP | 2005-040660 A | 2/2005 |
| JP | 2005-103399 A | 4/2005 |
| JP | 2007-244944 A | 9/2007 |
| JP | 2009-109037 A | 5/2009 |
| JP | 2015-108142 A | 6/2015 |
| JP | 2015-108142 A | 8/2015 |
| JP | 2015-223581 A | 12/2015 |
| WO | 2009/004911 A1 | 1/2009 |
| WO | 2014/123152 A1 | 8/2014 |

\* cited by examiner

REACTOR

CROSS REFERENCE TO RELATED APPLICATIONS

This application is a continuation application of International Application No. PCT/JP2017/001173, filed on Jan. 16, 2017, which claims priority of Japanese Patent Application No. 2016-024453, filed on Feb. 12, 2016, the entire contents of which are incorporated by reference herein.

BACKGROUND

Technical Field

The present disclosure relates to a heat exchange-type reactor that heats or cools a reaction fluid being a fluid containing a reactant (reaction raw material), using heat exchange with a heat medium, to cause a chemical reaction of the reactant to progress.

Description of the Related Art

Heat exchange-type reactors are known as chemical reactors that heat or cool a fluid in a gaseous or liquid state containing a reactant (reaction raw material) to cause a reaction of the reactant to progress. In such a reactor, a reaction flow channel in which a reaction fluid is caused to flow and a heat medium flow channel in which a heat medium fluid is caused to flow are provided in the apparatus. The reactor is configured such that while the reaction fluid and the heat medium are each supplied from an entrance and discharged from an exit, heat exchange between them progresses. Usually, to promote the heat exchange, the reaction flow channel and the heat medium flow channel, provided in the reactor, are each formed to separate into a plurality of flow channels, thereby increasing the heat transfer area. Also, since the progress of a chemical reaction can be promoted by use of a catalyst, placing a catalyst inside the reaction flow channel can improve the efficiency of the reaction inside the reaction flow channel.

Also, heat exchange-type reactors can be configured to use a fluid which supplies the heat of reaction generated by its reaction, instead of the heat medium which supplies heat or cold. In this case, a reactive fluid such as a combustion gas is supplied to the heat medium flow channel, and the heat or cold generated by its reaction is transferred to the reaction fluid in the reaction flow channel. Japanese Patent Application Laid-Open No. 2002-143675 (Publication Document 1 listed below) describes a plate fin-type reactor with a structure in which catalytic combustion chambers and reforming chambers are alternately stacked, and discloses that the catalytic combustion chambers and the reforming chambers include fins, respectively, on which a combustion catalyst or a reforming catalyst is supported.

In the reactor of Publication Document 1, the reaction progresses on both of the side that supplies heat and the side that demands heat, and a good heat balance is therefore needed between the catalytic combustion and the reforming. To address this, Patent Document 1 describes use of catalyzing fins of different properties to control the reaction rates.

DOCUMENTS LIST

Publication Document 1: Japanese Patent Application Laid-Open No. 2002-143675

BRIEF SUMMARY

In a basic heat exchange-type reactor, the heat or cold supplied to the reaction fluid is only the heat or cold of the heat medium and does not contain the heat of reaction. The heat balance can therefore be easily adjusted by controlling the flow rate of the heat medium. However, even when the heat balance is proper, the temperature profile along the direction of flow in the reaction flow channel often shows local abrupt changes. For example, in a case where an exothermic reaction of a reactant is caused to progress via cooling using a low-temperature heat medium, the temperature of a heat transfer wall forming the heat medium flow channel rises from the entrance side toward the exit side. Correspondingly, the temperature of the reaction fluid that flows as countercurrent to the heat medium drops as it flows from the entrance side toward the exit side, but the temperature is raised by the heat generation due to the progress of the reaction. The reaction of the reaction fluid weakens until the raised temperature drops again, and a longer reaction flow channel will be necessary if the temperature rise due to the progress of the reaction is remarkable. For this reason, for the progress of an exothermic reaction, removal of heat is usually the highest priority. Fins having such a high heat transfer performance as suitable for the portion requiring heat removal the most are selected and placed in the heat medium flow channel. However, the use of fins with high heat transfer performance increases the loss of flow pressure of the heat medium, which is not preferable in view of energy efficiency. Lowering the heat transfer performance in order to reduce the pressure loss impedes downsizing of the reactor and is not preferable also in view of reaction efficiency. The above applies to cases where an endothermic reaction is caused to progress by heating with a high-temperature heat medium, if a drastic temperature drop appears on the temperature profile. Also, in terms of thermal influences on the structural material of the heat exchanging body, it is desirable to avoid that a local and significant temperature difference is maintained for a long period of time.

To solve the above problems with heat exchange-type reactors, it is desirable to be able to adjust the temperature distribution in the apparatus to a suitable state. However, the temperature profile of a reaction flow channel varies depending on the conditions set for use of the reactor and so on. Then, in order to provide a reactor in which the temperature distribution is in a suitable state, it is necessary to make an adjustment for thermal migration inside the reactor in advance with the use condition taken into consideration. It is difficult to make such an adjustment with conventional reactors, and improvements are desired that enable local changes in heat transfer performance.

The present disclosure solves such problems, and an object thereof is to provide a heat exchange-type reactor in which a temperature distribution can be adjusted in advance to a suitable state by adjusting thermal migration from a heat medium to a reaction fluid in the reactor in accordance with use conditions, and the temperature distribution can be easily re-adjusted as necessity arises.

To solve the above problems, the present inventors have conducted an earnest research on thermal migration from a heat medium flow channel to a reaction flow channel, and found a simple configuration capable of easily adjusting the temperature distribution of a reaction flow channel by local adjustment of thermal migration utilizing members constituting the reactor. As a result, the present inventors have reached the technique of the present disclosure. The technique of the present disclosure can be provided as a simple system capable of easily adjusting the temperature distribution inside a reactor by utilizing a heat transfer promoter that promotes the heat transfer. With this applied to an existing reactor, it is possible to re-adjust the temperature distribution to an appropriate state in accordance with the state of implementation.

According to an aspect of the present disclosure, a reactor is summarized as comprising: a heat exchanging body that includes therein a heat medium flow channel in which a heat medium is caused to flow, and a reaction flow channel in which a reaction fluid is caused to flow, to exchange heat between the heat medium and the reaction fluid; and a heat transfer promoter that is provided in the heat medium flow channel and comes in close contact with the heat exchanging body in order to promote heat transfer between the heat medium and the heat exchanging body, the heat transfer promoter being constituted by an assembly of partial heat transfer promoters of a plurality of types. The partial heat transfer promoters of the plurality of types may have heat transfer performances differing from one another by type and include a fin. Also, the partial heat transfer promoters of the plurality of types can be formed of a bent plate-shaped member. By replacing at least one of the partial heat transfer promoters of the plurality of types with a partial heat transfer promoter of a different type, it is possible to locally change the heat transfer performance of the heat transfer promoter and thereby adjust the temperature distribution in the reactor.

In the above reactor, each of the partial heat transfer promoters of the plurality of types may be formed to have a shape of a corrugated plate bent in such a manner as to be in surface contact with the heat exchanging body, have a shape of a corrugated plate bent at a substantially right angle, or include at least one of a small piece, a hole, a cutout, a louver, and a slit which can be hooked. The partial heat transfer promoters of the plurality of types can be formed such that they are different from one another in at least one of heat conductivity of a constituent material and contact area with the heat medium, and the shapes of the corrugated plates of the partial heat transfer promoters of the plurality of types can be different from one another by type in at least one of pitch and height. The above reactor may be configured to further include a catalyst that promotes a reaction of the reaction fluid, in the reaction flow channel. Alternatively, the reactor may be configured such that the heat medium flow channel and the reaction flow channel of the heat exchanging body are formed, respectively, to include a plurality of parallel branch flow channels, and that the heat medium and the reaction fluid flow through the plurality of branch flow channels in opposite directions.

Also, according to the present disclosure, a reactor that utilizes heat exchange between a heat medium and a reaction fluid through a heat exchanging body including therein a heat medium flow channel and a reaction flow channel to cause a reaction of the reaction fluid to progress can be provided with a temperature distribution adjustment system capable of adjusting a temperature distribution in the heat exchanging body. Thus, an adjustment can be made to supply a preferable amount of heat from the heat medium to the reaction fluid. The temperature distribution adjustment system includes: a heat transfer promoter that is fixed in a detachable manner inside the heat medium flow channel and comes in close contact with the heat exchanging body in order to promote heat transfer between the heat medium and the heat exchanging body, the heat transfer promoter being constituted by an assembly of a plurality of replaceable partial heat transfer promoters; and at least one replacement body that has different heat transfer performance from that of the plurality of partial heat transfer promoters and is replaceable with each of the plurality of partial heat transfer promoters. A temperature distribution inside the heat exchanging body is changed by locally changing the heat transfer performance of the heat transfer promoter through replacement of at least one of the plurality of partial heat transfer promoters with the replacement body.

According to embodiments of the present disclosure, a temperature distribution in a reactor can be adjusted to an appropriate state in an easy and simple manner through local adjustment of heat transfer performance. Hence, it is possible to provide a reactor whose temperature distribution is adjusted to a suitable temperature distribution in accordance with reaction conditions, use conditions, and the like. Providing a reactor in which easy re-adjustment makes possible to reduce the maintenance cost and good energy efficiency and reaction efficiency can also achieved, it can contribute to stable supply of a target reaction product and reduction of the production cost.

DETAILED DESCRIPTION OF EMBODIMENTS

Figure 1:
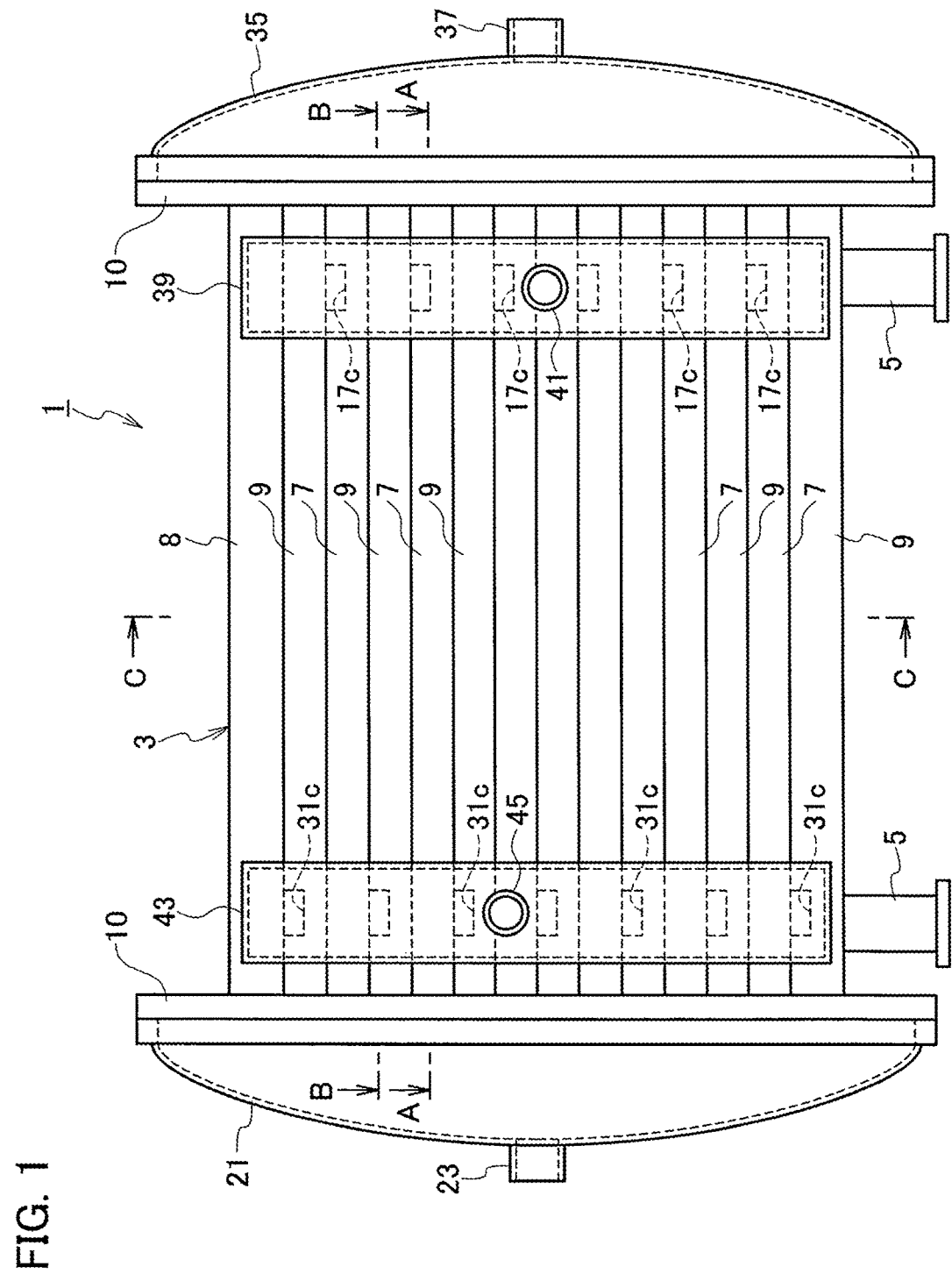
FIG. 1 is a side view illustrating a reactor in one embodiment of the present disclosure.

In a heat exchange-type reactor, the temperature distribution, i.e. temperature profile, in a heat medium flow channel and a reaction flow channel from the entrance to the exit changes due to the condition of the heat transfer from the heat medium flow channel to the reaction flow channel, and it also changes due to other factors. Specifically, the temperature profile changes also due to the temperature of a heat medium supplied and its flow rate, the reaction rate of a reaction fluid and the heat of the reaction, the type of a reaction catalyst to be used and its reaction properties, and so on.

When an exothermic reaction of a reactant is caused to progress by cooling with use of a low-temperature heat medium (coolant), even if the theoretical amount of heat generation by the progress of the reaction can be balanced with the amount of heat removal, there may be a case where an abrupt temperature rise occurs in the temperature distribution in the reaction flow channel in the vicinity of the entrance as a result of starting the exothermic reaction. If the temperature rise is significant, the temperature recovery with the cooling will be delayed, so it is necessary to set long the reaction time and the reaction flow channel. Similarly, in the case where an endothermic reaction is caused to progress by heating with use of a high-temperature heat medium, a delay in reaction progress may occur due to an abrupt temperature decrease. In addition, an excessively large local temperature difference may cause partial thermal denaturation of the structural material of the heat exchanging body. It is therefore desirable to eliminate extreme fluctuations in the temperature profile. In order to mitigate these abrupt temperature changes, it is necessary to locally enhance the heat transfer to the reaction fluid in the portion where the temperature fluctuation occurs. In other words, the temperature profile in the reaction flow channel can be adjusted to a suitable state by the configuration capable of locally changing the amount of thermal migration from the heat medium flow channel to the reaction flow channel.

The thermal migration from the heat medium flow channel to the reaction flow channel can be improved by providing a heat transfer promoter in the heat medium flow channel. The heat transfer promoter is a member that, by being attached to the inside of the heat medium flow channel, increases the area of contact with (the area of heat transfer from) the heat medium and accordingly supply more heat from the heat medium to the reaction fluid, i.e. a heatsink, and is made of a material with high thermal conductivity. For example, fins used in a gas-liquid heat exchanger correspond to the heatsink, and they are commercially available in various shapes (note that a "fin" refers to a plate- or pin-shaped protruding object, but a product obtained by providing such protruding objects on a base is also referred to as a fin). Representative factors indicating the performance of a heatsink, i.e. the heat transfer performance are the heat resistance and the pressure loss of the fluid (dynamic pressure loss). The heat transfer performance is high when the heat resistance value and the pressure loss are small. As the heat transfer area of the heat transfer promoter increases, the heat resistance for the heat transfer between the heat medium and the heat exchanging body decreases, thereby enhancing the heat transfer performance and increasing the amount of heat migration. However, the increase in heat transfer area increases the pressure loss, which decreases the heat transfer between the heat medium and the heatsink. Thus, in designing the structure, care is usually taken so that the pressure loss due to the increase in heat transfer area will not be excessive. In conventional heat exchange-type reactors, fins of a single type are mounted as the heat transfer promoters, and therefore the heat transfer promoting effect is uniform across the entire apparatus. Specifically, the heat transfer performance is uniform from the entrance to the exit, and no local change is made to any part of the flow channel.

With regard to this, the present disclosure utilizes a heat transfer promoter constituted by an assembly of a plurality of partial heat transfer promoters which can be recombined. In the basic configuration of the heat transfer promoter, the plurality of partial heat transfer promoters are of the same type, that is, the heat transfer is enhanced substantially equally over the entire heat transfer promoter by uniform heat transfer performance. By replacing at least one of them with another partial heat transfer promoter of a different type, it is possible to locally change the heat transfer performance of the heat transfer promoter in the replaced portion, thereby adjusting the amount of heat transfer there. Therefore, based on a temperature distribution obtained by measurement performed in a pilot reaction or by a simulation, the heat transfer can be adjusted by replacing a partial heat transfer promoter so as to make smooth the temperature change at and around the place showing abrupt temperature fluctuation (such as a region at which the reaction starts) on the temperature profile along the flow direction in the heat transfer wall surrounding the reaction flow channel. Moreover, it is possible to optimize the heat balance such that there is no excess or shortage in amount of heat, by adjusting the balance of the heat transfer performance so that the temperature profile line has a desired gradient. Hence, an efficient reactor can be provided. The temperature distribution in the reactor can be changed in various ways by changing the position at which the heat transfer performance of the heat transfer promoter is changed. Thus, the temperature distribution in the reactor can be adjusted as appropriate in accordance with necessity that is not limited to suppression of temperature changes and improvement of the temperature gradient. In other words, changing the heat transfer performance of the heat transfer promoter can be utilized as a way to solve various heat-related problems inside the reactor, and the reactor can be adjusted to a good condition by adjusting the temperature distribution as appropriate anytime in accordance with changes in reaction conditions or characteristics of the reactor.

Hereinbelow, embodiments of the present disclosure will be described in detail as mere examples with reference to the drawings. The flow of a heat medium and a reaction fluid in a reactor will be described with reference to FIG. 1 to FIG. 3, and heat transfer promoters and catalytic bodies disposed in heat medium flow channels and reaction flow channels will be described using FIG. 4 and FIG. 5. Also, FIG. 6 and FIG. 7 will be referred to for description of partial heat transfer promoters constituting each heat transfer promoter. It is noted that illustration of the heat transfer promoters and the catalytic bodies is omitted in FIG. 1 to FIG. 3. The dimensions and the materials as well as the specific numerical values and so on described in the embodiments are mere examples for facilitating the understanding of the disclosed content, and are not intended to limit the present disclosure unless otherwise noted. Also, in the description and the drawings, redundant description of elements having substantially the same function and configuration will be omitted by denoting them with the same reference sign, and illustration of elements that are not directly related to the present disclosure will be omitted.

A reactor 1 illustrated in the drawings is a heat exchange-type reactor and has a heat exchanging body 3 as its main component. In the following embodiments, the heat exchanging body 3 is described as a plate-type heat exchanging body formed of a stack of heat transfer bodies of a flat plate shape in which grooves for flow channels are formed. However, in the present disclosure, the heat exchanging body does not need to be formed of such a stack, but may be a heat exchanging body with a different configuration. For example, a heat exchanging body may be formed by stacking, instead of heat transfer bodies having grooves, heat transfer bodies each including a flat plate with no groove and wall plates arranged thereon side by side for defining a flow channel. Alternatively, a honeycomb-type heat exchanging body with an integral structure processed to have pores for flow channels by drilling or molding, a double tube-type or multi-tube-type heat exchanging body formed using a plurality of tubes, or the like may be used. The heat exchanging body 3 is supported by rigid and heat-insulative support columns 5. The heat exchanging body 3 illustrated in FIG. 1 includes a plurality of first heat transfer bodies 7 and second heat transfer bodies 9 and a lid body 8. The first heat transfer bodies 7, the second heat transfer bodies 9, and the lid body 8 are flat plate members of a rectangular shape, being made of a heat-resistant and heat conductive material. A groove for forming a reaction flow channel or a heat medium flow channel is formed in one surface of each of the first heat transfer bodies 7 and the second heat transfer bodies 9. The first heat transfer bodies 7 and the second heat transfer bodies 9 are arranged horizontally and stacked alternately in the vertical direction, and the lid body 8 is placed at the top, so that a cuboidal stack is formed. Opposite ends of the stack are fitted into fixing members 10 of an annular quadrangle shape, and the stacked members are fixed in close contact with each other by the fixing members 10 placed around the outer peripheries, thereby the stacked structure is held. At the time of assembling the stack body, its members may be firmly fixed to each other by using a bonding method such as TIG (Tungsten Inert Gas) welding, diffusion bonding or the like, and a decrease in heat conductivity due to poor contact between the respective members and the like are prevented in this way. It is noted that although the heat exchanging body 3 can be configured by simply using at least one first heat transfer body 7 and at least one second heat transfer body 9, the larger the number of the first heat transfer bodies 7 and second heat transfer bodies 9, the higher the heat exchange performance. In this embodiment, a plurality of the first heat transfer bodies 7 and second heat transfer bodies 9 are used, the number of the second heat transfer bodies 9 is larger than the number of the first heat transfer bodies 7 by one, the second heat transfer bodies 9 are located at the uppermost and lowermost positions, and the first heat transfer bodies 7 are held between the second heat transfer bodies. Covering the periphery of the heat exchanging body 3 with a housing or a heat insulating material so as to suppress heat radiation from the heat exchanging body 3 is preferable for the reactor 1 from the viewpoint of suppressing heat loss. A plurality of the heat exchanging bodies 3 may be covered with a single housing so that the reactor 1 is configured to include the plurality of heat exchanging bodies 3.

The heat conductive material constituting each part of the heat exchanging body 3 can be a heat resistant metal such as iron-based alloys and nickel alloys. Specifically, heat resistant alloys such as iron-based alloys such as stainless steel and nickel alloys such as Inconel 625 (registered trademark), Inconel 617 (registered trademark), and Haynes 230 (registered trademark) can be given as examples. These heat conductive materials are preferable since they have durability (corrosion resistance) against the progress of the reaction in the reaction flow channel and combustion gases usable as the heat medium, but the material is not limited to these. Also, steel plated with an iron-based plating material, metal coated with a heat resistant resin such as fluororesin, carbon graphite, or the like may be used. The fixing members 10 for fixing the stack body are made of a material having heat resistance and strength, and it is preferable that the material has low thermal conductivity in order to suppress the heat loss due to heat dissipation. In the case where the fixing members 10 are made of the same material as that of the heat exchanging body 3, they may be covered with a heat insulating material. Making the housing so as to be connected to the fixing members 10 on both sides is preferable from the viewpoint of suppressing heat dissipation.

Figure 2:
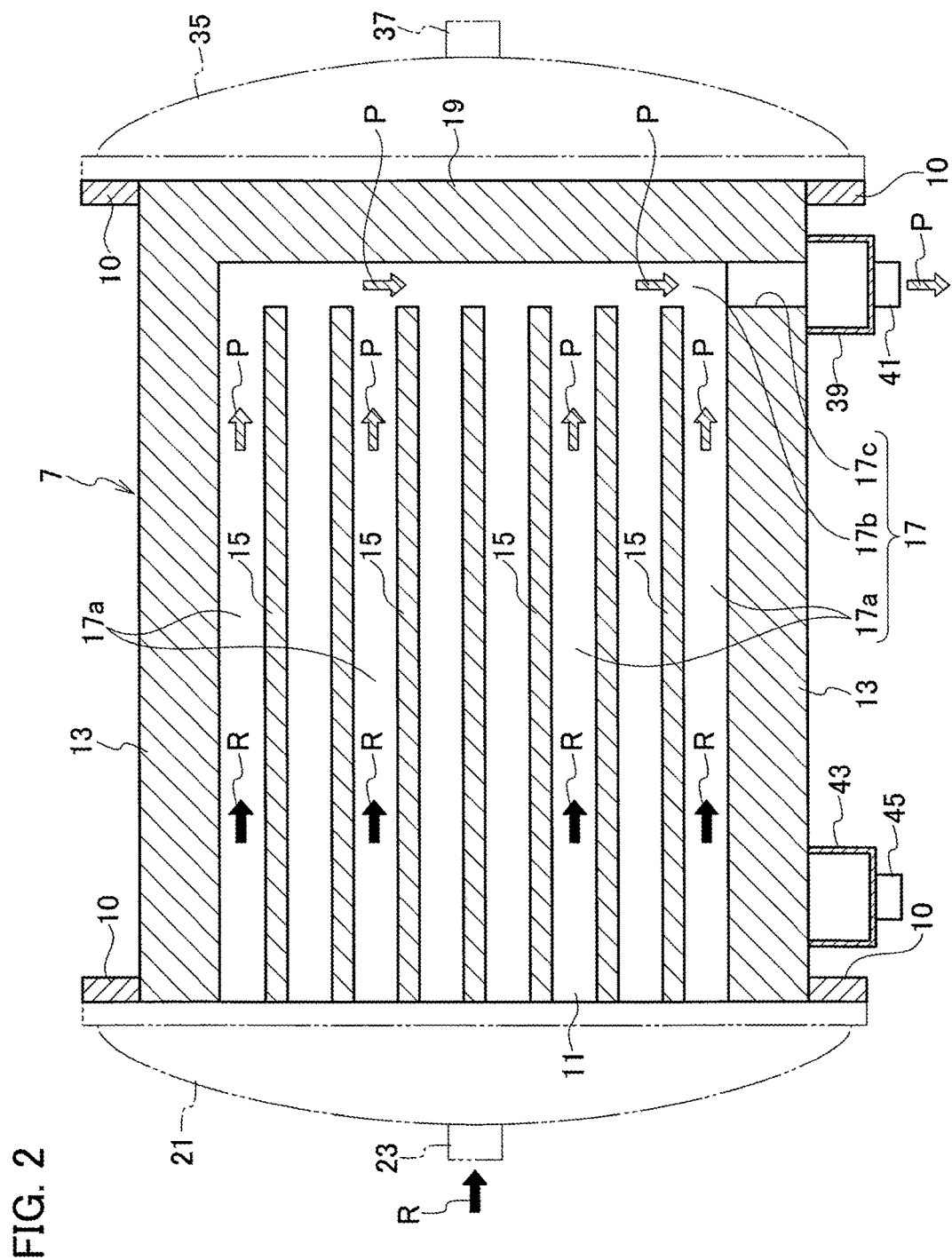
FIG. 2 is a cross-sectional view taken along the line A-A of the reactor in FIG. 1, for explaining the configuration of a reaction flow channel.

As illustrated in FIG. 2, each first heat transfer body 7, in which a groove is formed, includes a base portion 11, sidewall portions 13, intermediate wall portions 15, and an end wall portion 19. With the second heat transfer body 9 stacked on the first heat transfer body 7, the groove in the first heat transfer body 7 forms a reaction flow channel 17. The base portion 11 defines the bottom surface of the reaction flow channel 17. The sidewall portions 13, the intermediate wall portions 15, and the end wall portion 19 are provided to stand on the base portion 11 so as to define side surfaces of the reaction flow channel 17. The lower surface of the second heat transfer body 9 is the upper surface of the reaction flow channel 17. The sidewall portions 13 and the end wall portion 19 are provided along three ends of the first heat transfer body 7. The intermediate wall portions 15 are formed in parallel and at equal intervals between the sidewall portions 13 on the opposite sides. The reaction flow channel 17 includes a plurality of branch flow channels 17a, a merge channel 17b, and a discharge hole 17c. The branch flow channels 17a extend side by side at equal intervals with the intermediate wall portions 15 interposed therebetween. One ends of the branch flow channels 17a are connected by the merge channel 17b which lies perpendicular to them, while the opposite ends of the branch flow channels 17a are open to the outside. The discharge hole 17c penetrates through one of the sidewall portions 13 of the first heat transfer body 7 at one end portion thereof so as to extend the merge channel 17b.

Figure 3:
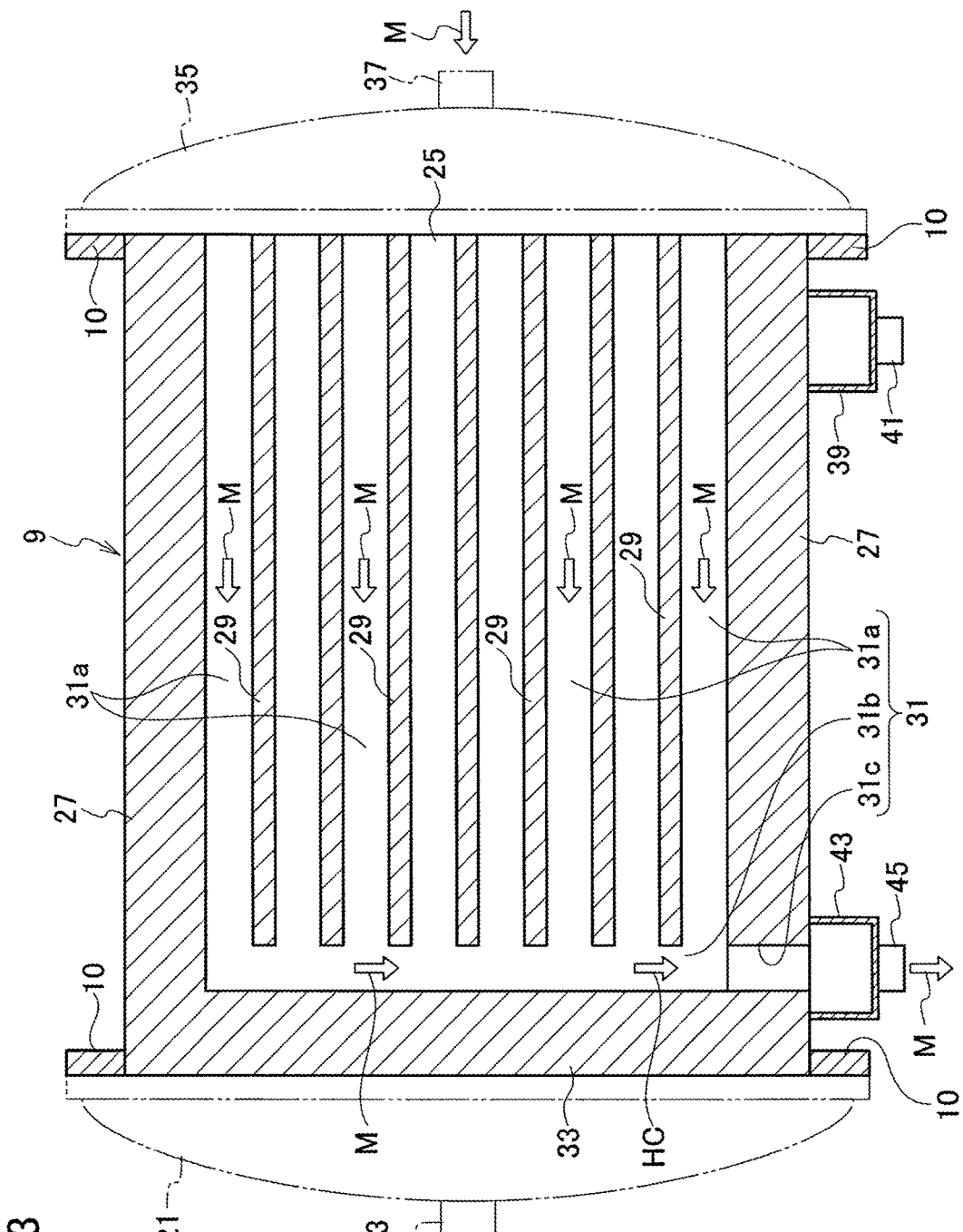
FIG. 3 is a cross-sectional view taken along the line B-B of the reactor in FIG. 1, for explaining the configuration of a heat medium flow channel.

On the other hand, as illustrated in FIG. 3, each second heat transfer body 9, in which a groove is formed, also includes a base portion 25, sidewall portions 27, intermediate wall portions 29, and an end wall portion 33. With the first heat transfer body 7 or the lid body 8 stacked on the second heat transfer body 9, the groove in the second heat transfer body 9 forms a heat medium flow channel 31. The base portion 25 defines the bottom surface of the heat medium flow channel 31. The sidewall portions 27, the intermediate wall portions 29, and the end wall portion 33 are provided to stand on the base portion 25 so as to define side surfaces of the heat medium flow channel 31. The lower surface of the first heat transfer body 7 or the lid body 8 is the upper surface of the heat medium flow channel 31. The sidewall portions 27 and the end wall portion 33 are provided along three ends of the second heat transfer body 9. The intermediate wall portions 29 are formed in parallel and at equal intervals between the sidewall portions 27 on the opposite sides. The heat medium flow channel 31 includes a plurality of branch flow channels 31a, a merge channel 31b, and a discharge hole 31c. The branch flow channels 31a extend side by side at equal intervals with the intermediate wall portions 29 interposed therebetween. One ends of the branch flow channels 31a are connected by the merge channel 31b which lies perpendicular to them, while the opposite ends of the branch flow channels 31a are open to the outside. The discharge hole 31c penetrates through one of the sidewall portions 27 of the second heat transfer body 9 at one end portion thereof so as to extend the merge channel 31b.

Figure 4:
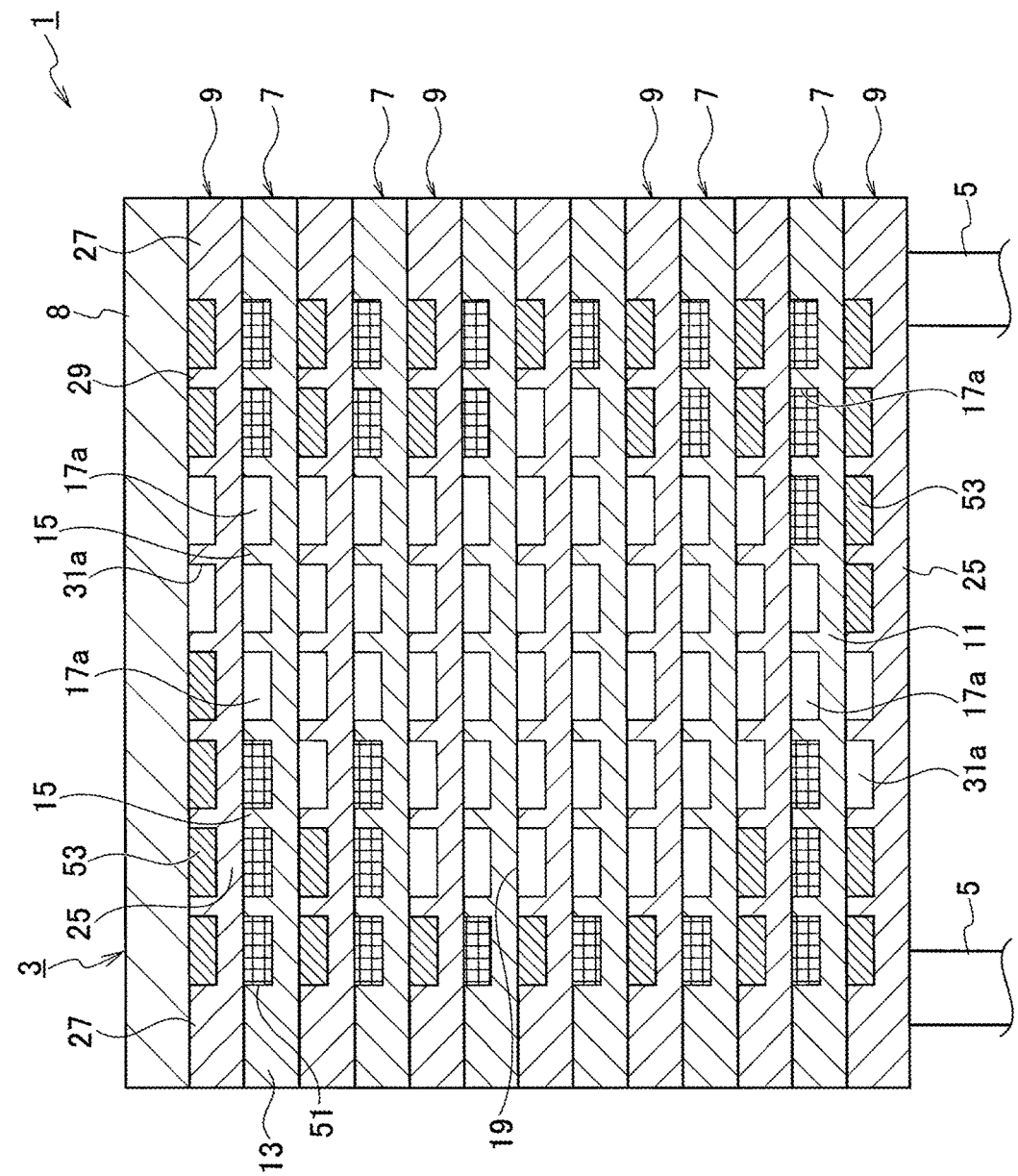
FIG. 4 is a cross-sectional view taken along the line C-C of the reactor in FIG. 1, for explaining the configurations inside the reaction flow channel and the heat medium flow channel.

As described above, the heat exchanging body 3 is formed of a stack of the first heat transfer bodies 7, the second heat transfer bodies 9, and the lid body 8 and, as illustrated in FIG. 4, includes therein the heat medium flow channels 31 (branch flow channels 31a) in which the heat medium is caused to flow, and the reaction flow channels 17 (branch flow channels 17a) in which the reaction fluid is caused to flow. The first heat transfer bodies 7 function as members that receive heat or cold supplied from the heat medium or the second heat transfer bodies 9 and supply it to the reaction fluid, while the second heat transfer bodies 9 function as members that supply heat or cold supplied by the heat medium directly to the reaction fluid and indirectly thereto through the first heat transfer bodies 7.

As illustrated in FIG. 1, the reaction flow channels 17 and the heat medium flow channels 31 are formed in such a manner that the discharge holes 31c of the heat medium flow channels 31 are located, on one side surface of the heat exchanging body 3, at the end portion opposite to the discharge holes 17c of the reaction flow channels 17. An end plate 21 curved in a concave shape is attached in a detachable manner or in an openable-closable manner to the side surface of the heat exchanging body 3 on the side where the branch flow channels 17a of the reaction flow channels 17 are open. With the end plate 21 covering the side surface of the heat exchanging body 3, a space is formed between the heat exchanging body 3 and the end plate 21. An inlet port 23 is provided on the end plate 21. Thus, as the reaction fluid is supplied from the inlet port 23, the reaction fluid splits into the branch flow channels 17a of each reaction flow channel 17 out of the space between the end plate 21 and the heat exchanging body 3, then merges at the merge channel 17b, and is discharged from the discharge hole 17c. Similarly, an end plate 35 curved in a concave shape is also attached in a detachable manner or in an openable-closable manner to the side surface of the heat exchanging body 3 on the side where the branch flow channels 31a of each heat medium flow channel 31 are open, i.e. the opposite side from the end plate 21. With the end plate 35 covering the side surface of the heat exchanging body 3, a space is formed between the heat exchanging body 3 and the end plate 35. An inlet port 37 is provided in the center of the end plate 35. As the heat medium is supplied from the inlet port 37, the heat medium splits into the branch flow channels 31a of each heat medium flow channel 31 out of the space between the end plate 35 and the heat exchanging body 3, then merges at the merge channel 31b, and is discharged from the discharge hoe 31c. Thus, the heat medium flow channels 31 and the reaction flow channels 17 are formed such that the heat medium and the reaction fluid flow in parallel but opposite directions in the branch flow channels 17a and the branch flow channels 31a.

Further, an elongated and hollow lead-out member 39 having an opening along its longitudinal direction is attached to the side surface of the heat exchanging body 3 so as to cover the discharge holes 17c of the reaction flow channels 17. As a result, a merge channel connecting the discharge holes 17c in the vertical direction is formed. Thus, the reaction fluid flowing in the reaction flow channels 17 passes through the discharge holes 17c into the lead-out member 39, in which the reaction fluid merges, and is discharged from a tubular outlet port 41 provided in the center of the lead-out member 39. Similarly, an elongated and hollow lead-out member 43 having an opening along its longitudinal direction is attached to the same side surface of the heat exchanging body 3 so as to cover the discharge holes 31c of the heat medium flow channels 31. As a result, a merge channel connecting the discharge holes 31c in the vertical direction is formed. Thus, the heat medium flowing in the heat medium flow channels 31 passes through the discharge holes 31c to thereby merge, and is discharged from a tubular outlet port 45 provided in the center of the lead-out member 43. It is noted that the direction of flow of the reaction fluid from the inlet port 23 to the outlet port 41 and the direction of flow of the heat medium from the inlet port 37 to the outlet port 45 can be changed in the opposite directions.

The reaction fluid is a fluid containing a reactant being a reaction raw material. While flowing through the branch flow channels 17a of the reaction flow channels 17, the reaction fluid receives the heat or cold of the heat medium flowing through the heat medium flow channels 31 and is thereby heated or cooled, so that the reaction progresses and the reactant is transformed into a product. The arrows denoted by reference sign R in FIG. 2 indicate the direction of the reactant to flow, while the arrows denoted by reference sign P indicate the direction of the product to flow. The arrows denoted by reference sign M in FIG. 3 indicate the direction of the heat medium to flow. The heat exchanging body 3 has a counter-flow type structure in which the reaction fluid and the heat medium flow in the opposite directions.

Figure 5:
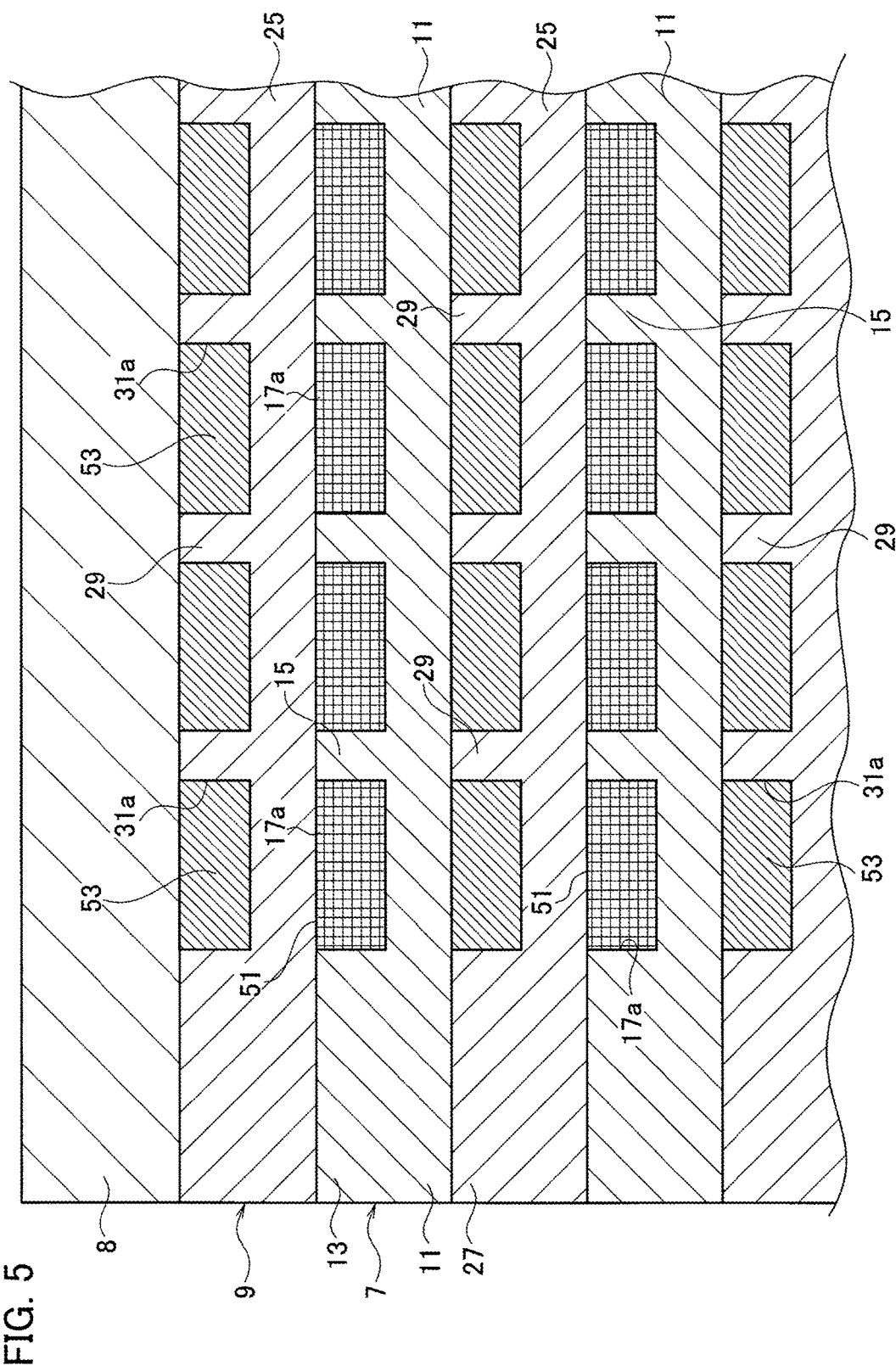
FIG. 5 is a partially enlarged view of the cross section of FIG. 4, for explaining heat transfer promoters and catalytic bodies.

As illustrated in FIG. 4 and FIG. 5, the reaction flow channels 17 and the heat medium flow channels 31 in the heat exchanging body 3 are formed as hollow portions whose cross sections perpendicular to the flow direction are rectangular. In this embodiment, eight branch flow channels 17a or branch flow channels 31a are formed in a single first heat transfer body 7 or second heat transfer body 9. However, the numbers of the branch flow channels 17a and the branch flow channels 31a are not limited to this, and are determined as appropriate with the design requirements, heat transfer efficiency, and the like of the heat exchanging body 3 taken into consideration. In view of heat transfer, it is usually preferable to provide several tens of branch flow channels 17a or branch flow channels 31a at intervals of about 1.0 times the flow channel width. It is also preferable to provide the reaction flow channels 17 and the heat medium flow channels 31 such that the intervals between them in the vertical direction (height direction) are about 0.2 to 5.0 times the intervals between these flow channels in the transverse direction. Further, although six first heat transfer bodies 7 and seven second heat transfer bodies 9 are stacked in this embodiment, the configuration is not limited to this. It is preferable to configure the stack body (heat exchanging body 3) with its height set close to its width so that its cross section perpendicular to the flow direction can be close to a square shape. It is noted that, although the grooves for forming the reaction flow channels 17 and the heat medium flow channels 31 in the illustrated embodiment are provided only on one side of the first heat transfer bodies 7 and the second heat transfer bodies 9, it is also possible to make a change such that grooves are provided on both sides of the first heat transfer bodies 7 and the second heat transfer bodies 9. Then the reaction flow channels 17 and the heat medium flow channels 31 are formed as combination of the upper and lower grooves in the stacked state.

A catalyst body 51 that promotes the reaction of the reactant is inserted in each of the branch flow channels 17a of the reaction flow channels 17 and fixed in close contact therewith so as to be capable of removal and insertion. A heat transfer promoter 53 that promotes the transfer of heat or cold from the heat medium to the heat exchanging body 3 is inserted in each of the branch flow channels 31a of the heat medium flow channels 31 and fixed in close contact therewith so as to be capable of removal and insertion. It is noted that the catalytic bodies 51 and the heat transfer promoters 53 in the reaction flow channels 17 and the heat medium flow channels 31 are hatched without illustration of their structures in FIG. 4 and FIG. 5, and illustration of the catalytic bodies 51 and the heat transfer promoters 53 in some of the reaction flow channels 17 and the heat medium flow channels 31 is omitted in FIG. 4.

Each catalyst body 51 is a member in which a catalyst that promotes the reaction of the reactant is carried on the surface of a structural material, and may be one obtained by supporting the catalyst on the structural material using a carrier. The catalyst is appropriately selected according to the reaction to proceed in the reactor 1. In order to increase the area of contact with the reaction fluid, the catalyst body 51 (structural material) may be one curved round in a wavy shape like a corrugated plate, one bent in a zigzag shape, or the like. Moreover, the length of the catalyst body 51 preferably corresponds to the branch flow channel 17a of the reaction flow channel 17 but is not limited to this.

Figure 6:
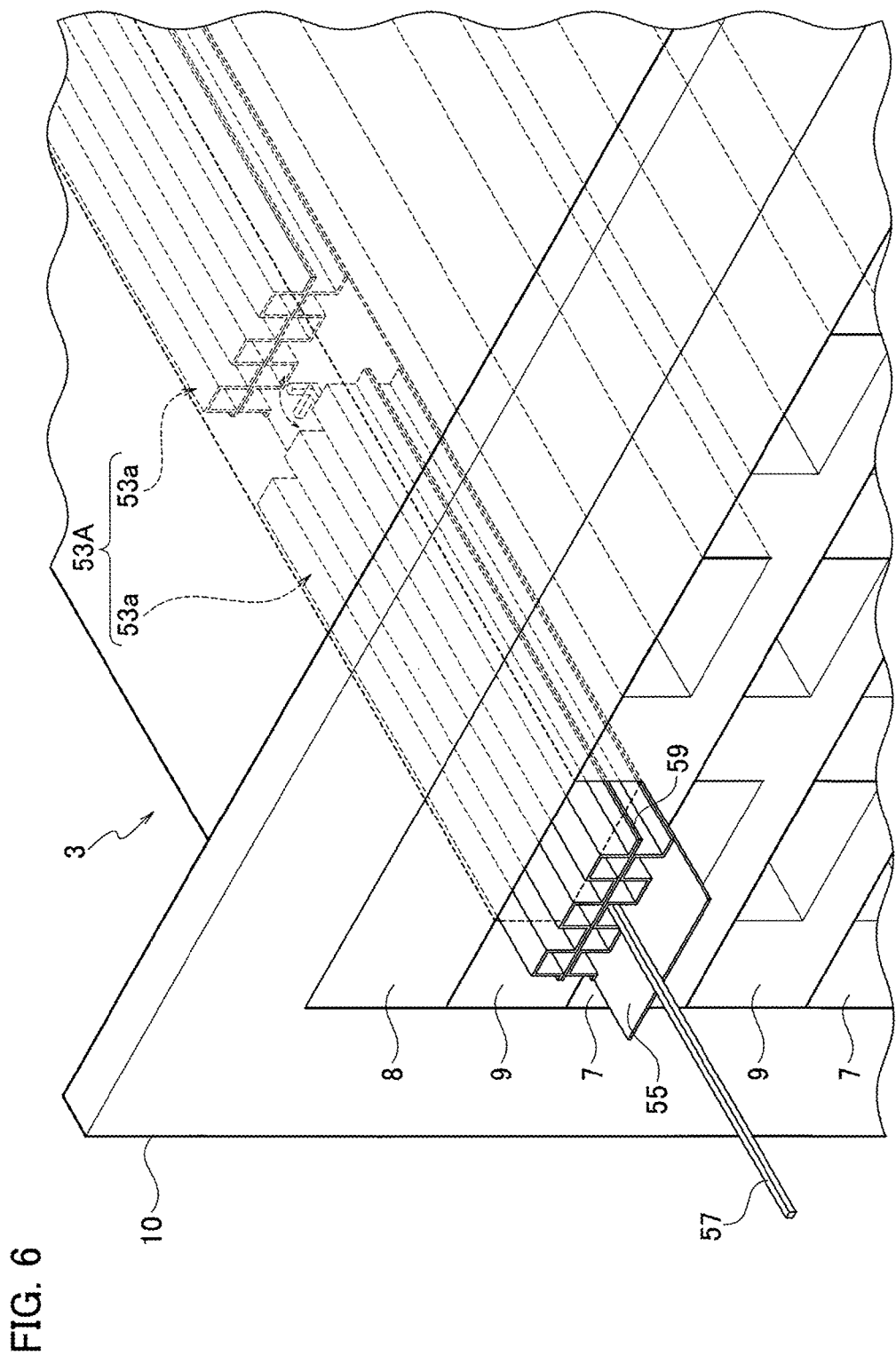
FIG. 6 is an explanatory view illustrating the configuration of a heat transfer promoter in one embodiment of the present disclosure.

On the other hand, each heat transfer promoter 53 is a heat conductive member that promotes the heat transfer between the heat medium and the heat exchanging body 3, i.e. a heatsink, and includes fins (protrusions in the shape of plates, pins, or the like protruding into the fluid). The fins act to increase the contact area with (the heat transfer area from) the heat medium, thereby lowering the thermal resistance and increasing the heat transfer rate from the heat medium. The heatsink is generally configured in a form in which a plurality of fins are integrally connected to bases as a single body, and the heat transferred from the heat medium to the fins is supplied through the bases to the heat exchanging body. Examples of commercially available heatsinks include ones obtained by arranging many fins in the shape of plates, pins, tubes, or the like side by side and joining them to a base plate, ones in a shape of corrugated plate, and the like. From such various heatsinks, one suitable for the dimensions and shape of the branch flow channel 31a of the heat medium flow channel 31 can be appropriately selected and used as the heat transfer promoter 53. The heat sink with a corrugated plate-like shape has a structure in which the amount of heat transfer is easy to calculate and which is advantageous in adjusting the heat transfer performance and is also hard to break during the work for insertion into or removal from the flow channel. As the heat transfer promoter 53, one that comes into close contact with the heat transfer wall surrounding the branch flow channel 31a is used in order to ensure heat transfer to the heat exchanging body 3. In this respect, a heat transfer promoter 53 that comes into surface contact with the heat exchanging body 3, such as a heat transfer promoter 53A in the shape of an angular corrugated plate illustrated in FIG. 6, or the like, is suitable for the heat transfer to the heat exchanging body 3. The heat transfer promoter 53A of FIG. 6 is formed in the shape of an angular corrugated plate, i.e. in the shape of a thin plate bent to define protrusions and grooves arranged alternately and extending side by side, and includes flat surfaces on the protrusion portions and the groove portions. Thus, the heat transfer promoter 53 inserted and fitted in the branch flow channel 31a is in close contact with each of the first heat transfer body 7 (or the lid body 8) and the second heat transfer body 9 at the flat surfaces of the protrusion portions and the groove portions, so that these portions function as bases while the other portions function as fins. In the structure of the heat transfer promoter 53 including base portions in surface contact with the heat exchanging body 3 as above, the thermal resistance between the fins and the heat exchanging body 3 is low, so that heat is easily transferred to the heat exchanging body 3. Accordingly, the heat transfer performance is better than that of the one in the shape of a wavy corrugated plate. Meanwhile, as illustrated as one embodiment in FIG. 6, inserting and fitting the heat transfer promoter 53A placed on a heat conductive thin flat plate 55 into the branch flow channel 31a of the heat medium flow channel 31 improves the tightness in contact with the first heat transfer body 7 and the second heat transfer body 9. However, the use of the flat plate 55 is optional, and the flat plate 55 may be omitted to simplify the structure. Examples of the heat conductive material for constituting the heat transfer promoter 53 and the flat plate 55 include metals such as aluminum, copper, stainless steel, and iron-based plated steel. Aluminum and copper are preferable since their heat conductivity is particularly high. Naval copper, aluminum brass, and the like are also preferable in the case of cold exchange using a coolant.

The heat transfer promoter 53 is configured as an assembly of a plurality of replaceable partial heat transfer promoters joined to each other in their longitudinal direction (flow direction). This can be made by utilizing objects that are typically used as heat radiating fins or heatsinks. For example, the heat transfer promoter 53A of the embodiment illustrated in FIG. 6 can be made by forming an assembly by preparing a corrugated plate of substantially the same length as the branch flow channel 31a, equally dividing this into a plurality of partial corrugated plates 53a' of the same length (in the flow direction) (see FIG. 7A), and joining them as partial heat transfer promoters 53a to constitute an aggregate. This can be used as each heat transfer promoter 53 in FIG. 1 to FIG. 5. Corrugated plates have different heat transfer performance depending on the heat conductivity of the constituent material and the contact area with the heat medium. Thus, by dividing a different corrugated plate having the same width, length, and height but a different pitch or plate thickness into parts of the same length, it is possible to obtain partial heat transfer promoters of a different type (replacement bodies) which have a different heat transfer area and which the partial heat transfer promoters can be replaced with. Similarly, replacement bodies can also be obtained from a corrugated plate of the same shape made of a different material. By using such a replacement body to replace at least one partial heat transfer promoter with the replacement body, the heat transfer promoter 53 is constituted by partial heat transfer promoters of a plurality of types and the heat transfer performance of the heat transfer promoter 53 is locally changed at the replaced position. By preparing various types of replacement bodies having different heat transfer performances, flexibility in adjustment of the heat transfer performance is enhanced. Then, an experimental measurement or a simulation may be conducted based on the configuration of the heat transfer promoter 53 in which partial heat transfer promoters having the same heat transfer performance are inserted and joined to each other in the branch flow channel 31a, to thereby study the temperature distributions in the flow direction at the wall portions (heat transfer walls) facing respectively the reaction flow channel 17 and the heat medium flow channel 31 of the first heat transfer body 7 and the second heat transfer body 9. Based on that result, a part or all of the partial heat transfer promoters may be appropriately replaced with a replacement body, and it is thus possible to adjust the temperature distribution by changing the heat transfer performance in this way. With such an operation, the temperature gradient (temperature change) in the temperature distribution of the wall portion facing the reaction flow channel 17 can be adjusted to a suitable one.

Incidentally, the corrugated plate can be obtained by repeatedly performing a bending process on a thin plate material from one end to fold it. It is therefore possible to prepare a corrugated plate of a suitable shape as needed, by preparing a thin plate of a material that is selected as appropriate from the heat conductive materials as mentioned above; setting bending intervals in accordance with the length, width, and height of the branch flow channel 31a of the heat medium flow channel 31, so as to provide dimensions for being tightly fixed into the branch flow channel 31a; and performing a bending process to make perpendicular bends. A corrugated plate obtained after performing the bending process using a thin plate material of the same length as the branch flow channel 31a may be cut and divided by the length of the partial heat transfer promoter, or thin plate materials processed to have the length of the partial heat transfer promoter may be subjected to the bending process.

To replace a partial heat transfer promoter with a replacement body, the partial heat transfer promoter is pulled out of the branch flow channel 31a which is opened by detaching (or opening) the end plate 35. In this connection, an offset-type corrugated plate with cutouts created by shifting the phase of the corrugation can be utilized, and this may be divided into partial corrugated plates 53b' (see FIG. 7B), which can be used to form the partial heat transfer promoters and the heat transfer promoter 53, with easy operation for replacement. Specifically, with a straight pulling bar 57 with a bent tip as illustrated in FIG. 6, the partial heat transfer promoter can be easily pulled out by hooking the bar in a cutout portion of the partial heat transfer promoter. Such an easy replacement operation as above is possible also in the case of using a louver-type corrugated plate on which a louver is formed or a slit-type corrugated plate provided with slits, which is not limited to the case of offset type. Further, a heat transfer promoter formed of a basic corrugated plate as illustrated in FIG. 6 or of a wavy corrugated plate can also constitute the heat transfer promoter 53 in which the replacing operation is easy, by providing it with a small piece, a hole, a cutout, or the like that can be hooked on the pulling bar 57.

The larger the number of partial heat transfer promoters (the shorter the length in the flow direction) constituting the heat transfer promoter 53, the higher the accuracy of adjustment of the heat transfer performance. Thus the number of partial heat transfer promoters (the length in the flow direction) can be determined as appropriate in accordance with the required adjustment accuracy. Also, in a case where accumulated data on the relation between the heat supplied from the heat medium and the temperature distribution indicates that the portion requiring frequent replacement is limited to a specific region, the heat transfer promoter 53 does not need to be constituted by partial heat transfer promoters of the same length (in the flow direction). For example, the heat transfer promoter 53 can instead be constituted by short partial heat transfer promoters and long partial heat transfer promoters. In this case, the heat transfer promoter 53 may be constituted by joining the short and long partial heat transfer promoters such that the short partial heat transfer promoters are arranged at the specific region and the long partial heat transfer promoters are arranged at the other regions (of low replacement frequency). Replacement bodies may be formed to have the same length as the short partial heat transfer promoters.

Also, in FIG. 6, the heat transfer promoter 53A and each partial heat transfer promoter 53a are formed of a stack of two corrugated plates of the same type. However, they may be formed of a single plate or a stack of three or more plates. They may be a stack of a plurality of corrugated plates of different types. Increasing the number of layers of corrugated plates (reducing the height of a single corrugated plate) increases the contact area of the heat transfer promoter 53 with the heat medium and accordingly enhances the heat transfer performance. Corrugated plates stacked in the vertical direction are likely to be unstable if they are in the same phase state. However, sandwiching and interposing a heat conductive thin flat plate 59 between the upper and lower corrugated plates as illustrated in FIG. 6 stabilizes them and thereby makes it easier for them to be inserted and fitted into the branch flow channel 31a of the heat medium flow channel 31. In this case, the flat plate 59 increases the contact area with the heat medium. Then, making the flat plate 59 from a material similar to that of the above-mentioned flat plate 55 enhances the heat transfer performance of the heat transfer promoter 53. The replacement operation will be easy if the length of the flat plate 59 (in the flow direction) is equal to that of a partial heat transfer promoter 53a.

Figure 7A:
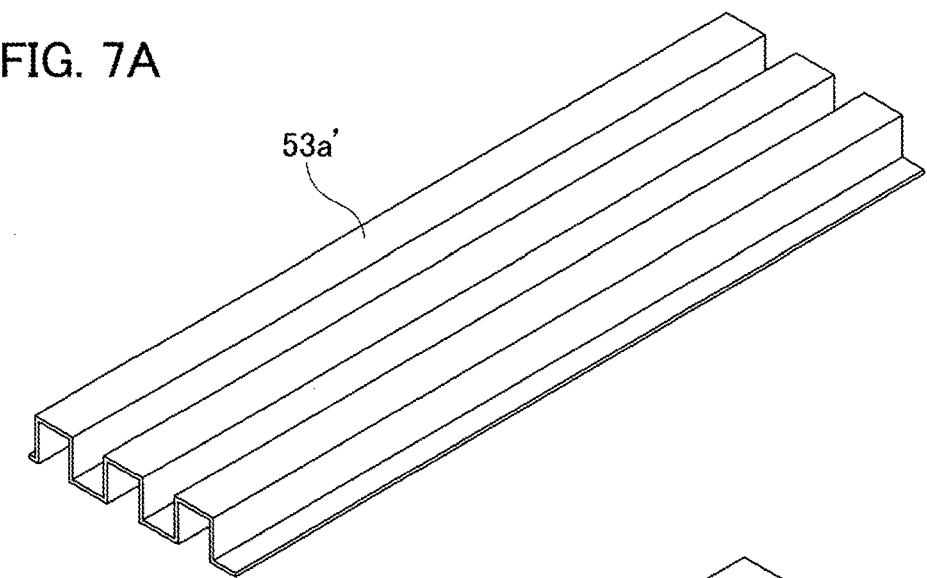
FIG. 7A, FIG. 7B and FIG. 7C are a set of explanatory views illustrating configuration examples of a partial heat transfer promoter in one embodiment of the present disclosure.
Figure 7B:
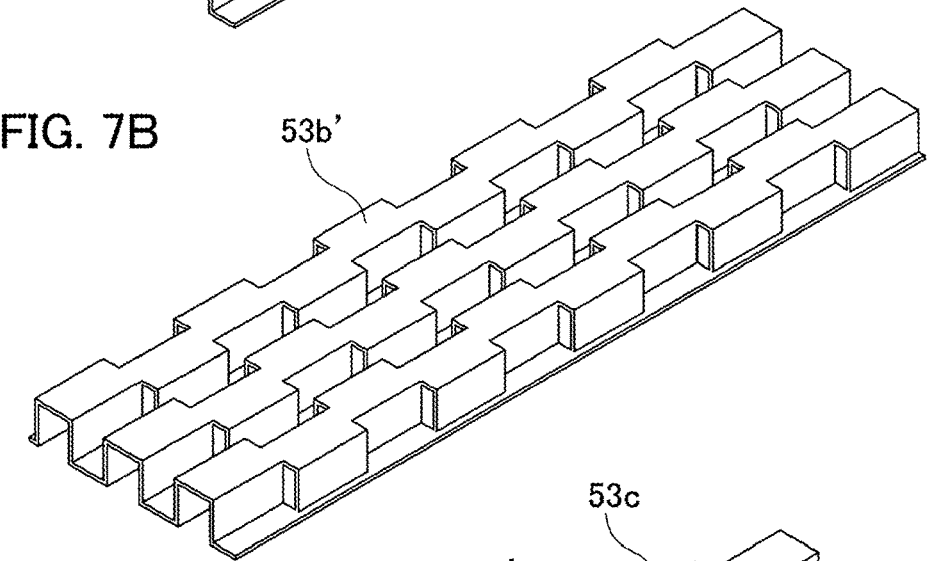
Figure 7C:
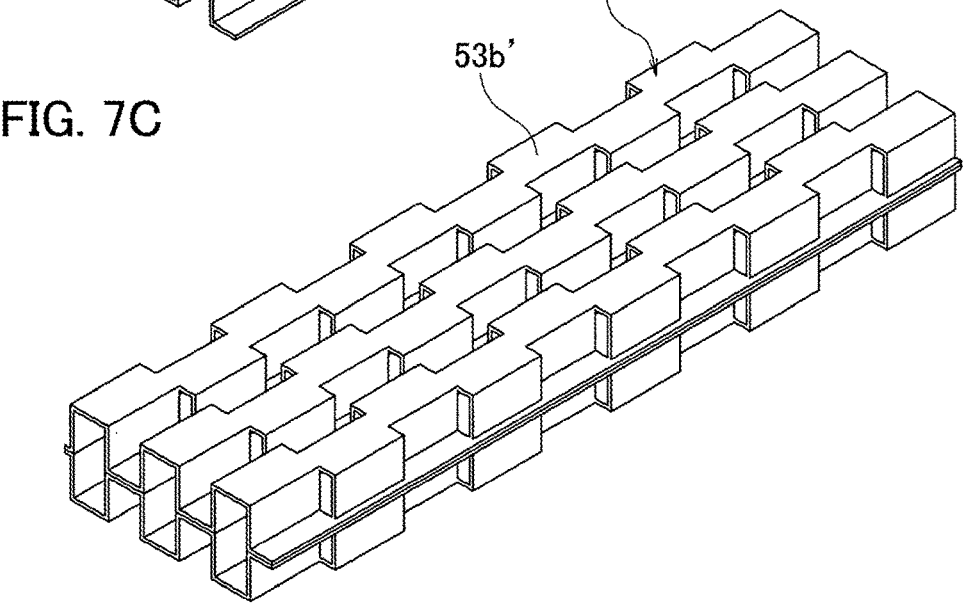

FIG. 7A to FIG. 7C specifically illustrate examples of partial heat transfer promoters which are different in heat transfer performance. FIG. 7A illustrates, as an example, a partial corrugated plate 53a' constituting the partial heat transfer promoter 53a of FIG. 6, and the partial heat transfer promoter 53a can be formed by stacking two partial corrugated plates 53' with the flat plate 59 interposed therebetween. FIG. 7B illustrates an example of the case utilizing an offset-type corrugated plate. A partial heat transfer promoter is formed by stacking partial corrugated plates 53b' obtained by dividing an offset-type corrugated plate, with the flat plate 59 interposed therebetween. The pitch and height of each partial corrugated plate 53b' are the same as those of the partial corrugated plate 53a' in FIG. 7A, but the phase is regularly shifted by ¼ along the flow direction. In this case, since turbulence occurs at the positions where the phase is shifted, the pressure loss slightly increases but the heat transfer is improved. Accordingly, the heat transfer performance is higher than that of the partial corrugated plate 53a' which has no phase shift. In other words, the heat transfer performance also changes with the frequency at which the phase is shifted. Further, though illustration is omitted, corrugated plates with a small pitch and height, e.g. corrugated plates with ½ of the pitch and height of the partial corrugated plate 53a', may be used in this way to form a partial heat transfer promoter similarly by stacking four of these corrugated plates with the flat plate 59 interposed therebetween. Thus, using corrugated plates with a small pitch or height can enhance the heat transfer performance of the heat transfer promoter 53. Then, various partial heat transfer promoters with increased heat transfer performance can be obtained by decreasing at least one of the pitch and the height. Conversely, partial heat transfer promoters with decreased heat transfer performance can be obtained by increasing at least one of the pitch and the height. Meanwhile, FIG. 7C shows a partial heat transfer promoter 53c using the same partial corrugated plate 53b' as that in FIG. 7B. However, the upper corrugated plate is shifted in pitch by ½ relative to the lower corrugated plate, and no flat plate is interposed between the corrugated plates. Accordingly, the heat transfer performance of the partial heat transfer promoter 53c is low as compared to a case where the flat plate 59 is interposed. Thus, with a stacked configuration as illustrated in FIG. 7C, it is possible to use the same corrugated plate to form a partial heat transfer promoter with decreased heat transfer performance, and it is also stable without a flat plate interposed. It is noted that, while the bending angle of the partial corrugated plates constituting the heat transfer promoters and the partial heat transfer promoters in FIG. 4 to FIG. 7 is substantially a right angle, the bending angle may be less than 90 degrees or more than 90 degrees. In that case, the cross section of each branch flow channel 31a is defined as a trapezoidal shape by the heat transfer promoter 53. If the internal bending angle is less than 90 degrees, the heat transfer performance increases due to reduction in the pitch, and, if the internal bending angle is more than 90 degrees, the heat transfer performance decreases due to increase in the pitch. It is also possible, with the internal bending angle of less than 90 degrees, to form a corrugated plate with which the cross section of the branch flow channel is defined in a triangle shape.

As illustrated in FIG. 7, a partial heat transfer promoter (replacement body) with the same material but different heat transfer performance can be provided by changing the contact area with the heat medium based on the difference in shape of the corrugated plates to be used and/or the presence or absence of the intervening flat plate. Alternatively, a partial heat transfer promoter (replacement body) with different heat transfer performance may be formed by utilizing a different constituent material, since the heat transfer performance of a partial heat transfer promoter can vary with the heat conductivity of its constituent material.

When a plurality of partial heat transfer promoters having the same heat transfer performance are sequentially inserted and fitted in one of the branch flow channels 31a of the heat medium flow channels 31, the partial heat transfer promoters are linearly joined to each other and form a heat transfer promoter 53 inside the branch flow channel 31a. The heat transfer performance for transfer of heat or cold from the heat medium to the first heat transfer body 7 and the second heat transfer body 9 is uniform across the entire branch flow channel 31a. Assuming that the temperature distribution along the flow direction in the wall portion (heat transfer wall) of the first heat transfer body 7 or the second heat transfer body 9 facing the reaction flow channel 17 in the above state is a standard temperature distribution, replacing one of the partial heat transfer promoters with a partial heat transfer promoter (replacement body) with different heat transfer performance changes the amount of heat transfer to the first heat transfer body 7 and the second heat transfer body 9 at the replaced position in accordance with the heat transfer performance. As a result, the temperature of the first heat transfer body 7 and the second heat transfer body 9 at and around the replaced position changes, thereby changing the temperature distribution curve of the wall portion. For example, in a case of a heating system using a high-temperature heat medium, replacing a partial heat transfer promoter with a replacement body with higher heat transfer performance raises the temperature of the wall portion at the replaced position, whereas replacing a partial heat transfer promoter with a replacement body with lower heat transfer performance lowers the temperature of the wall portion at the replaced position. Then, based on the standard temperature distribution curve, it is possible to determine the position (replacement position) at which the heat transfer performance is to be changed and the degree of the change, by comparing the standard temperature distribution curve with a target temperature distribution curve. A replacement body is selected in accordance with the degree of the change in heat transfer performance thus determined, and the partial heat transfer promoter at the replacement position is replaced with the replacement body. In this way, the temperature distribution curve can approximate the target temperature distribution curve, and the heat transfer promoter is constituted by partial heat transfer promoters of a plurality of types. The number of partial heat transfer promoters replaced with a replacement body is not limited to one. All partial heat transfer promoters may be replaced. By adjusting the temperature distribution curve in this manner such that it has a suitable temperature gradient with drastic temperature changes eliminated, it is possible to optimize the progress of the reaction.

Figure 8A:
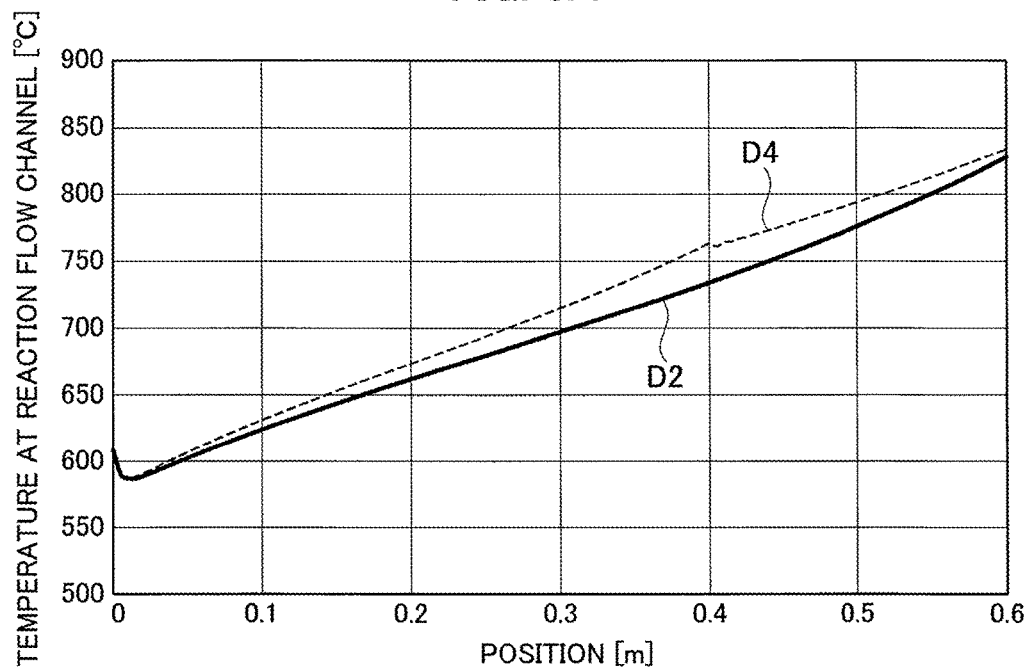
FIG. 8A and FIG. 8B are a set of temperature distribution graphs illustrating the temperature distribution at the reaction flow channel side (FIG. 8A) and the temperature distribution at the heat medium flow channel side (FIG. 8B), for explaining the operation of the heat transfer promoter.
Figure 8B:
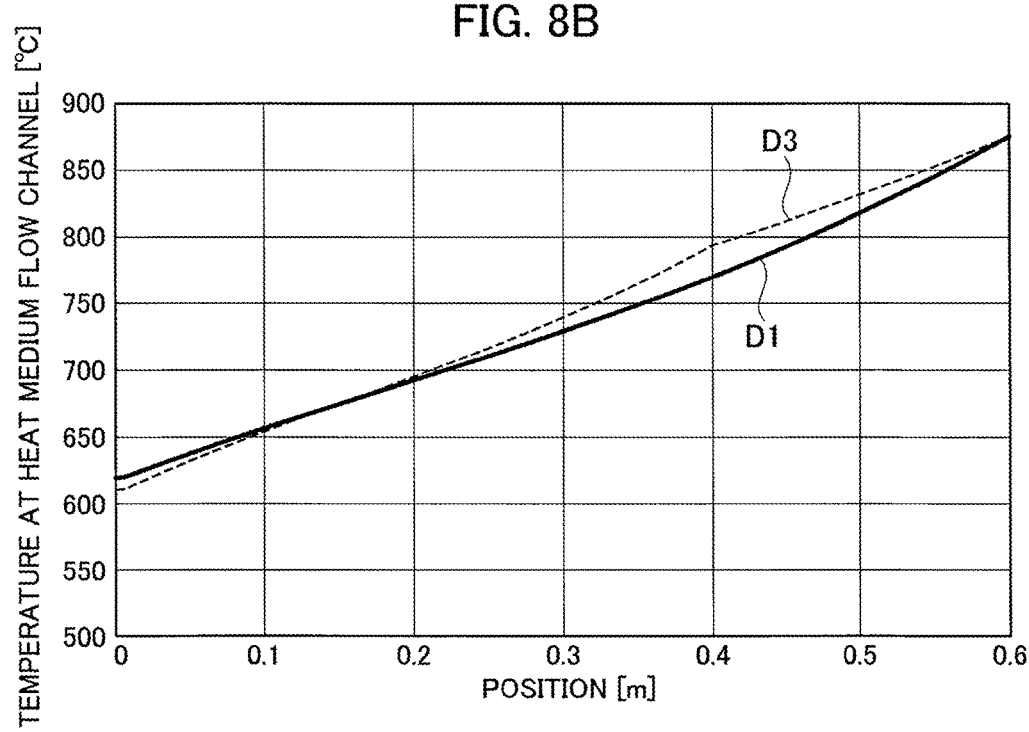

An example of adjustment of the temperature distribution curve as described above will be described below with reference to FIG. 8A and FIG. 8B. FIG. 8A and FIG. 8B are a set of graphs obtained by calculating, based on a simulation, the temperature distribution at the reaction flow channel side (FIG. 8A) and the temperature distribution at the heat medium flow channel side (FIG. 8B) in the heat exchanging body 3 with the reaction fluid and the heat medium supplied therein, in the reactor 1 having the structure illustrated in FIG. 1 to FIG. 3. In the temperature distribution graphs of FIG. 8A and FIG. 8B, the horizontal axes represent respectively the position along the direction of flow in the flow channel in terms of the distance [unit: m] from the entrance-side end of the branch flow channel 17a of the reaction flow channel 17. The vertical axes represent respectively the temperature [° C.] at the reaction flow channel side (FIG. 8A) and the heat medium flow channel side (FIG. 8B) in the heat exchanging body 3. The temperature at the reaction flow channel side is calculated as the temperature of the wall portions of the base portion 11 and the base portion 25 of the first heat transfer body 7 and the second heat transfer body 9 facing their reaction flow channel 17. The temperature at the heat medium flow channel side is calculated as the temperature of the wall portions of the base portion 11 and the base portion 25 of a first heat transfer body 7 and the second heat transfer body 9 facing their heat medium flow channel 31. Also, the calculations are performed by assuming, as reaction conditions, a case of supplying a reformed raw material prepared in advance (containing methane (main raw material), water, carbon monoxide, and carbon dioxide; temperature: 630° C.) as the reaction fluid and a combustion gas (temperature: 875° C.) as the heat medium. Incidentally, it is assumed that a catalyst body obtained by supporting a catalyst on the surface of a wavy structural member is inserted and fitted in each of the branch flow channels 17a of the reaction flow channels 17.

In FIG. 8A and FIG. 8B, reference signs D1 and D2 represent temperature distribution curves assuming a case (setting 1) where an assembly of partial heat transfer promoters joined to a length of 0.6 m is inserted and fitted as the heat transfer promoter 53 in each of the branch flow channels 31a of the heat medium flow channels 31, the partial heat transfer promoters each being formed as a stack of two partial corrugated plates 53b' in FIG. 7B with the flat plate 59 interposed therebetween. Reference signs D3 and D4 represent temperature distribution curves assuming a case (setting 2) where a 0.6 m-long assembly of partial heat transfer promoters joined to a length of 0.4 m and then the partial heat transfer promoters 53c in FIG. 7C joined to a length of 0.2 m is inserted and fitted into each of the branch flow channels 31a of the heat medium flow channels 31, the former partial heat transfer promoters each being formed as a stack of four partial corrugated plates having the same length as the partial corrugated plate 53b' in FIG. 7B but ½ of the pitch and height thereof.

With setting the heat transfer promoter 53 uniformly promotes the heat transfer over the entire flow channel, so that the temperature distribution at the heat medium flow channel side is close to a linear temperature distribution. However, the temperature gradient is higher at the position exceeding 0.4 m (⅓ region on the upstream side) (the curve of reference sign D1 in FIG. 8B). Due to the balance between the temperature rise resulting from the heat transfer corresponding to this and the heat absorption resulting from the progress of the reaction, the temperature at the reaction flow channel side appears as the curve of reference sign D2 in FIG. 8A and the temperature gradient is higher at the position exceeding 0.4 m (⅓ on the downstream side). In contrast, with setting 2, the heat transfer promoter 53 is formed such that the heat transfer performance at ⅓ of the heat medium flow channel on the upstream side is lower than setting 1 while the heat transfer performance at ⅔ on the downstream side is higher than setting 1. Accordingly, the heat transfer is suppressed at the upstream side of the heat medium flow channel and the heat of the heat medium is transferred intensively at the downstream side of the heat medium flow channel (=the upstream side of the reaction flow channel). Hence, on the temperature distribution on the heat medium flow channel side, the temperature gradient over the region from 0 to 0.4 m (⅔ on the downstream side) is higher than setting 1, while the temperature gradient over the region exceeding 0.4 m (⅓ on the upstream side) is lower than setting 1, as illustrated by the curve of reference sign D3. Correspondingly, on the temperature distribution at the reaction flow channel side too, the temperature gradient over the region from 0 to 0.4 m (⅔ on the upstream side) is higher than setting 1, and the temperature gradient over the region exceeding 0.4 m (⅓ on the downstream side) is lower than setting 1, as illustrated by the curve of reference sign D4. Consequently, the temperature difference between the positions at 0.4 m and 0.6 m at the heat medium flow channel side decreases from approximately 106° C. (setting 1) to approximately 78° C. (setting 2), and the temperature difference at the reaction flow channel side decreases from approximately 95° C. (setting 1) to approximately 76° C. (setting 2).

As described above, the temperature distribution along the flow channel in the heat exchanging body 3 may be studied and the performance of heat transfer from the heat medium flow channel 31 to the heat exchanging body 3 may be changed by unit of partial heat transfer promoter, by replacing a part or all of the partial heat transfer promoters constituting the heat transfer promoter 53. In this way, the temperature distributions at each heat medium flow channel and each reaction flow channel can be adjusted to be close to the ideal temperature distribution curves. The temperature distributions vary depending on the condition of the reaction, the condition of supply of the heat medium, properties of the catalyst, and so on. Then, it is possible to provide a reactor in which the temperature distributions are adjusted in advance to preferable states in accordance with these conditions. In this way, the reactor exhibits its performance well, and thus the load and the energy consumption during operation can be reduced and a longer usage life can be ensured. Usually, the partial heat transfer promoters are joined such that the length of the heat transfer promoter 53 corresponds to the length of the branch flow channel 31a of the heat medium flow channel 31. However, no partial heat transfer promoter is used in a configuration in which the heat transfer performance is set to the lowest level. Thus, in a setting utilizing such a configuration, the entire length of the heat transfer promoter 53 does not correspond to the length of the branch flow channel 31a but is smaller than the length of the branch flow channel 31a. It is noted that excessive increase in resistance to flow is not preferable not only in view of the heat transfer performance but also in view of the mechanical power for supplying the fluid. For this reason, the increase in resistance to flow due to the increase in the contact area with the heat medium and the like are preferably taken into consideration when the heat transfer promoter 53 is selected. This also applies to the catalyst body 51.

The above-described heat exchanging body 3 is usable as any of a liquid-liquid heat exchanger, a gas-gas heat exchanger, and a gas-liquid heat exchanger. Thus, the reaction fluid and the heat medium to be supplied into the reactor 1 of the present disclosure may be a gas or a liquid, respectively. The configuration of the reactor 1 of the present disclosure is applicable to a reactor in which its reaction flow channels have a large specific surface area per unit volume, or a so-called compact reactor, and the reactor 1 can be used to implement chemical syntheses with various thermal reactions (endothermic reactions, exothermic reactions). Examples of syntheses with such thermal reactions include syntheses with endothermic reactions such as the methane steam-reforming reaction presented by formula (1) below and the methane dry-reforming reaction presented by formula (2) below, and exothermic reactions such as the shift reaction presented by formula (3) below, the methanation reaction presented by formula (4) below, and the Fischer-Tropsch synthesis reaction presented by formula (5) below. The reaction fluids in these reactions are gaseous.

$$CH_4 + H_2O \rightarrow 3H_2 + CO \qquad \text{Formula (1)}$$

$$CH_4 + CO_2 \rightarrow 2H_2 + 2CO \qquad \text{Formula (2)}$$

$$CO + H_2O \rightarrow CO_2 + H_2 \qquad \text{Formula (3)}$$

$$CO + 3H_2 \rightarrow CH_4 + H_2O \qquad \text{Formula (4)}$$

$$(2n+1)H_2 + nCO \rightarrow C_nH_{2n+2} + nH_2O \qquad \text{Formula (5)}$$

Other than the above reactions, the technique of the present disclosure may also be applied to execution of reactions such as acetylation reaction, addition reaction, alkylation reaction, dealkylation reaction, hydrogen dealkylation reaction, reductive alkylation reaction, amination reaction, aromatization reaction, arylation reaction, autothermal reforming reaction, carbonylation reaction, decarbonylation reaction, reductive carbonylation reaction, carboxylation reaction, reductive carboxylation reaction, reductive coupling reaction, condensation reaction, decomposition (cracking) reaction, hydrogen decomposition reaction, cyclization reaction, cyclooligomerization reaction, dehalogenation reaction, dimerization reaction, epoxidation reaction, esterification reaction, exchange reaction, halogenation reaction, hydrogenation reaction, hydrogen halogenation reaction, homologation reaction, hydration reaction, dehydration reaction, dehydrogenation reaction, hydrogen carboxylation reaction, hydrogen formylation reaction, hydrogenolysis reaction, hydrogen metalation reaction, hydrosilylation reaction, hydrolysis reaction, hydrotreating reaction, isomerization reaction, methylation reaction, demethylation reaction, metathesis (substitution) reaction, nitration reaction, oxidation reaction, partial oxidation reaction, polymerization reaction, reduction reaction, reverse water gas shift reaction, sulfonation reaction, telomerization reaction, transesterification reaction, and trimerization reaction.

A fluid containing a substance (reactant) such as a raw material to participate in a chemical reaction as listed above can be supplied as a reaction fluid to the reactor to synthesize a target product. The reaction fluid may contain a carrier that is not involved in the reaction. The carrier can be appropriately selected from the substances that do not affect the progress of the reaction, in consideration of the chemical reaction to be carried out. Carriers usable for a gaseous reaction fluid include gaseous carriers such as an inert gas or a low-reactive gaseous substance (at the temperature inside the reactor).

Also, fluidic substances that do not corrode the constituent material of the reactor are usable as the heat medium. For example, liquid substances such as water and oil and gaseous substances such as a combustion gas are usable. A configuration using a gaseous substance as the heat medium is easy to handle as compared to the case of using a liquid medium. The reaction fluid and the heat medium may be supplied to the heat exchanging body in either form of counter-flow type or parallel-flow type, and can be optionally switched between them if necessary.

The catalyst constituting the catalyst body 51 contains, as its main component, an active metal as mentioned above effective in promoting the progress of the chemical reaction. A catalyst suitable for the promotion of the reaction is selected as appropriate based on the synthetic reaction to be implemented in the reactor 1. Examples of the active metal as a catalytic component include Ni (nickel), Co (cobalt), Fe (iron), Pt (platinum), Ru (ruthenium), Rh (rhodium), Pd (palladium), and the like; one of them may be used or two or more of them may be used in combination as long as they are effective in promoting the reaction. The catalyst body 51 is prepared by supporting, on a structural member, the catalyst selected in accordance with the reaction to be carried out. For the structural member, a metal that can be shaped and support the catalyst is selected from available heat-resistant metals, and it is shaped into a thin wavy plate shape corresponding to the above-mentioned catalyst body 51. Examples of the heat-resistant metal include heat-resistant alloys containing, as their main component, one or more metals such as Fe (iron), Cr (chromium), Al (aluminum), Co (cobalt), Ni (nickel), Mg (magnesium), Ti (titanium), Mo (molybdenum), W (tungsten), Nb (niobium), and Ta (tantalum). For example, the catalyst body 51 is preferably made by shaping a thin structural member made of a heat-resistant alloy such as Fecralloy (registered trademark). A commercially available product shaped as a corrugated plate may instead be obtained and used. As for the method of loading the catalyst, an existing technique can be utilized to implement the method, and a suitable method may be selected as appropriate from known methods in accordance with the catalyst to be used. Specifically, there are: a method of directly supporting the catalyst on the structural member by surface modification or the like; a method of indirectly supporting the catalyst by using a carrier, and so on. Practically, it is easy to support the catalyst by using the carrier. As the carrier, a material that is durable and does not impede the progress of the reaction and can support the catalyst to be used in a good manner is selected as appropriate with the reaction to be carried out in the reactor 1 taken into consideration. Examples of the carrier include metal oxides such as $Al_2O_3$ (alumina), $TiO_2$ (titania), $ZrO_2$ (zirconia), $CeO_2$ (ceria), and $SiO_2$ (silica), and one or more of them can be selected and used as the carrier. The supporting method using the carrier can be selected as appropriate from publicly known methods. Examples of the method include a method in which a layer of a mixture of the catalyst and the support is formed on the surface of the shaped structural material, a method in which a layer of the carrier is formed on the surface of the structural member and then the catalyst is loaded thereon by surface modification or the like, and so on.

Like the heat transfer promoter 53, the catalyst body 51 used in the present disclosure can also be formed of an assembly of a plurality of replaceable partial catalytic bodies. In a case where the amount of the reactant introduced into the reaction flow channel 17 is larger, deposition of carbon (coking) and the like may occur at the surface of the catalyst body 51. This may possibly increase the likelihood of reduction in activity of the catalyst and deterioration thereof. Also, in a case where dust is mixed into the reaction fluid, the dust may possibly clog the branch flow channel 17a of the reaction flow channel 17 and lower the reaction efficiency. In such a case, the catalyst body, being constituted by an assembly of a plurality of partial catalytic bodies, can be replaced only at the deteriorated or clogged portion of the catalyst body. In other words, replacement of the whole catalyst body can be avoided. Accordingly, it is possible to minimize the amount of replacement of the catalyst body, and reduce the cost required for performance adjustment and maintenance of the reactor.

In the present disclosure, the heat transfer promoter, whose heat transfer efficiency is locally changeable, can be attached to and detached from a heat medium flow channel as long as it extends linearly with one end opened. The heat transfer promoter is therefore applicable to reactors including a heat exchanging body with a structure in which straight reaction flow channels and heat medium flow channels extend side by side. Also, in the above embodiment, description has been given of the heat medium flow channels whose cross sections perpendicular to the flow direction are rectangular. However, the technique of the present disclosure is applicable to cases where the cross sections of the heat medium flow channels are of other shapes. In particular, in the case of forming the grooves for forming the heat medium flow channels in both surfaces of the first heat transfer body and the second heat transfer body and joining them together, heat medium flow channels in the shape of a circular cylinder or an elliptical cylinder can be easily formed by forming grooves in the shape of a circular semi-cylinder or an elliptical semi-cylinder. Thus temperature distribution adjustment as described above is possible by dividing a heat transfer promoter in conformity with such a shape into a plurality of partial heat transfer promoters.

Although preferred embodiments of the present disclosure have been described above with reference to the accompanying drawings, the present disclosure is not limited to those embodiments. It is to be understood that various modifications and adjustments that those skilled in the art can conceive of also belong to the technical scope of the present disclosure within the scope described in the claims, as a matter of course.

By applying the technique of the present disclosure to a heat exchange-type reactor in which a thermal reaction involving generation or absorption of heat is caused to progress by utilizing heat exchange with a heat medium, it is made possible to locally change the heat transfer performance. As a result, a reactor is provided which has good energy efficiency and reaction efficiency resulting from adjustment of the temperature distribution to an appropriate state. This can contribute to stable supply of the target reaction product, and reduction of the production cost.

As there are many apparently widely different embodiments of the disclosure that may be made without departing from the spirit and scope thereof, it is to be understood that the disclosure is not limited to the specific embodiments thereof, except as defined in the appended claims.

What is claimed is:
1. A reactor comprising:
 a heat exchanging body that includes therein a heat medium flow channel in which a heat medium is caused to flow, and a reaction flow channel in which a reaction fluid is caused to flow, to exchange heat between the heat medium and the reaction fluid and cause a thermal reaction in the reaction fluid to progress; and a heat transfer promoter that is provided in the heat medium flow channel and comes in close contact with the heat exchanging body in order to promote heat transfer between the heat medium and the heat exchanging body, the heat transfer promoter being constituted by an assembly of partial heat transfer promoters of a plurality of types which have heat transfer performances different from one another by type and are joined to each other in a flow direction.

2. The reactor according to claim 1, wherein the partial heat transfer promoters of the plurality of types include a fin.

3. The reactor according to claim 1, wherein each of the partial heat transfer promoters of the plurality of types is formed of a bent plate-shaped member.

4. The reactor according to claim 3, wherein each of the partial heat transfer promoters of the plurality of types has a shape of a corrugated plate bent in such a manner as to be in surface contact with the heat exchanging body.

5. The reactor according to claim 3, wherein each of the partial heat transfer promoters of the plurality of types has a shape of a corrugated plate bent at a substantially right angle.

6. The reactor according to claim 1, wherein each of the partial heat transfer promoters of the plurality of types includes at least one of a small piece, a hole, a cutout, a louver, and a slit which can be hooked.

7. The reactor according to claim 1, wherein the partial heat transfer promoters of the plurality of types are different from one another in at least one of thermal conductivity of a constituent material and contact area with the heat medium.

8. The reactor according to claim 4, wherein the shapes of the corrugated plates of the partial heat transfer promoters of the plurality of types are different from one another by type in at least one of pitch and height.

9. The reactor according to claim 5, wherein the shapes of the corrugated plates of the partial heat transfer promoters of the plurality of types are different from one another by type in at least one of pitch and height.

10. The reactor according to claim 1, further comprising:
a catalyst that promotes a reaction of the reaction fluid, in the reaction flow channel.

11. The reactor according to claim 1, wherein the partial heat transfer promoters of the plurality of types have the same length and are replaceable to locally change the heat transfer performance.

* * * * *